United States Patent [19]

Belart et al.

[11] Patent Number: 4,521,061
[45] Date of Patent: Jun. 4, 1985

[54] HYDRAULIC BRAKE SYSTEM WITH SLIP CONTROL

[75] Inventors: Juan Belart, Walldorf; Jochen Burgdorf, Offenbach-Rumpenheim; Lutz Weise, Mainz; Dieter Kircher, Frankfurt am Main, all of Fed. Rep. of Germany; André F. L. Goossens, Rumst, Belgium

[73] Assignee: ITT Industries, Inc., New York, N.Y.

[21] Appl. No.: 508,294

[22] Filed: Jun. 24, 1983

[30] Foreign Application Priority Data

Jul. 19, 1982 [DE] Fed. Rep. of Germany ....... 3226987

[51] Int. Cl.³ .......................... B60T 8/10; B60T 13/00; B60T 8/12
[52] U.S. Cl. .................................. 303/114; 60/547.1; 188/181 R
[58] Field of Search ................... 188/181 R; 303/114, 303/119, 113, 116; 60/547.1, 548

[56] References Cited

U.S. PATENT DOCUMENTS

| | | | |
|---|---|---|---|
| 3,910,643 | 10/1975 | Kobashi et al. | 303/114 |
| 4,354,714 | 10/1982 | Belart | 303/114 |
| 4,440,454 | 4/1984 | Belart et al. | 303/119 X |

FOREIGN PATENT DOCUMENTS 2065807  7/1981  United Kingdom ................ 303/116

Primary Examiner—Bruce H. Stoner, Jr.
Assistant Examiner—Robert J. Oberleitner
Attorney, Agent, or Firm—James B. Raden; William J. Michals

[57] ABSTRACT

The hydraulic brake system with slip control comprises a master cylinder piston for operating a wheel brake, in which hydraulic medium tapped from the wheel brake during slip control will be supplied to the wheel brake from an auxiliary pressure source via a master cylinder gasket acting as check valve. The operating stroke of the master cylinder piston is limited by pressurization of a positioning piston through which a master cylinder piston rod is passed in a sealed manner and which is guided axially displaceable in a sealed manner in a housing. In order to prevent an abrupt movement of the positioning piston upon pressurization the positioning piston is constructed as a stepped piston whose smaller diameter is sealed with respect to the housing and having a piston step which in combination with the seal between the smaller diameter portion of the positioning piston and the housing annular chamber with a volume which is dependent on the pedal travel. The annular chamber has a throttling connection to the front surface of the positioning piston pressurized in case of slip control, which throttling connection has a check valve which opens towards the annular chamber.

19 Claims, 1 Drawing Figure

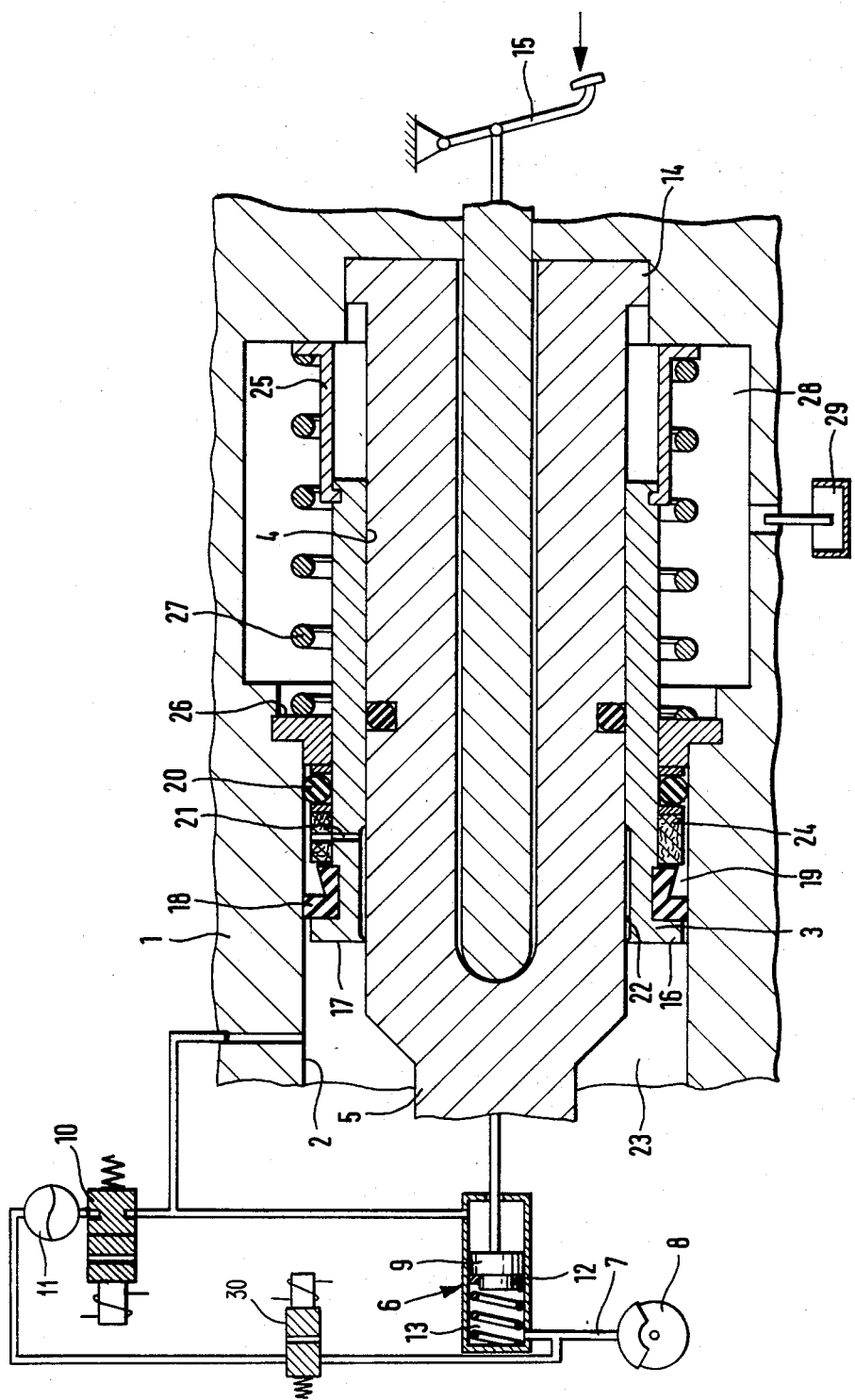

HYDRAULIC BRAKE SYSTEM WITH SLIP CONTROL

BACKGROUND OF THE INVENTION

The present invention relates to a hydraulic brake system with slip control, in particular for motor vehicles, in which at least one master cylinder piston is provided for the operation of a vehicular brake, in which hydraulic medium tapped from the wheel brake during slip control is supplied to the wheel brake from an auxiliary pressure source via a master cylinder gasket acting as check valve, and in which the operating stroke of the master cylinder piston is limited by pressurization of a positioning piston through which a master cylinder piston rod is passed in a sealed manner and which is sealingly guided and axially displaceably in a housing.

In a brake system according to a prior art arrangement a tandem master cylinder is used which is operable by a hydraulic brake booster. The hydraulic brake booster has a booster piston accommodating a brake valve which permits establishing a pressure in the pressure chamber of the hydraulic booster which is proportional to the operating force. A first brake circuit is connected to the pressure chamber of the hydraulic brake booster leading to the wheel brakes of the rear axle of a motor vehicle.

Upon displacement of the booster piston there will be a pressurization of the working chambers of the tandem master cylinder. Each of the working chambers of the tandem master cylinder has communication with a different wheel brake preferably situated at the front axle of the vehicle. Thus, within a three-circuit brake system, each of the front wheels are pressurized separately in a static manner while the actuation of the rear wheel brakes will be dynamic.

Associated with the vehicular brakes are electromagnetically operable valves switchable by control electronics so as to ensure that pressure medium will be tapped from one or several wheel brakes in the case of critical lock-up values. The pressure medium tapped from the dynamic brake circuit will be directly replaced from an auxiliary pressure source via the brake valve. Pressure medium tapped from the static circuits will be replaced by the pressurization of the front or end surfaces of the corresponding master cylinder pistons adjacent the brake pedal so that pressure medium may flow via axial channels in the master cylinder piston and a gasket, acting as check valve, into the working chambers of the tandem master cylinder.

In order to safeguard that there will always remain a certain residual volume in the working chambers of the tandem master cylinder, the brake apparatus has a positioning piston whose front or end surface remote from the brake pedal is pressurized by the pressure of the dynamic circuit during slip control. The positioning piston essentially has the construction of a hollow cylinder. The positioning piston is sealed at its outside circumference and guided in a bore of the housing. Within the internal bore of the positioning piston the master cylinder piston rod is axially displaceably guided in a sealed manner. Upon pressurization of the positioning piston, the positioning piston will move in certain operational conditions against an enlarged circumferential end of the master cylinder piston rod. Thus, the positioning piston will keep the master cylinder pistons in a defined position in which there will be available a sufficient volume reserve in the working chambers of the tandem master cylinder. Upon pressurization, under certain conditions, the positioning piston will abruptly abut at the enlarged circumferential end of the master cylinder piston rod which will cause a corresponding jerk at the brake pedal. This jerk will inform the driver of the vehicle of the onset of the control of the brake slip. On the other hand, however, the abrupt return of the brake pedal may also lead to a distraction of the driver's attention to traffic in driving situations which are critical anyway.

SUMMARY OF THE INVENTION

It is, therefore, an object of the present invention to provide a brake system as described hereinabove so as to enable the positioning piston to come into contact with the enlarged circumferential end of the master cylinder piston rod in a relatively soft way in case of slip control.

A feature of the present invention is the provision of a hydraulic brake system for motor vehicles with slip control comprising a master brake cylinder having at least one master cylinder piston operating a vehicle wheel brake, hydraulic medium removed from the wheel brake during slip control being supplied to the wheel brake from an auxiliary pressure source via a gasket acting as a first check valve disposed on the circumferences of the master cylinder piston; a hollow positioning piston axially guided in and sealed to an axial bore of a housing, the positioning piston having an end surface thereof pressurized by said auxiliary pressure source during slip control to limit the operating stroke of said master cylinder piston; and a master cylinder piston rod axially guided in and sealed to the inner surface of the positioning piston; the positioning piston being a stepped piston having a large diameter portion, a smaller diameter portion sealed at a given point with respect to said axial bore and a step between the smaller diameter portion and the larger diameter portion, the step and the given point defining an annular chamber having a volume dependent on movement of the master cylinder piston rod, the chamber having a throttling connection to the end surface disposed on the surface of the larger diameter portion remote from the step, the throttling connection having a second check valve therein which opens towards the annular chamber.

Thus, upon the onset of the brake slip control the annular chamber contains a volume which upon pressurization of the larger front surface of the positioning piston will escape through the throttling connection. Upon such a pressurization, at first, pressure medium will flow in the annular chamber, gradually displacing the volume contained in this chamber. At the first moment, the pressure resulting in the annular chamber will be higher than the pressure acting on the positioning piston. Gradually the higher pressure will be decreased via the throttling connection. Thus, the positioning piston will not move abruptly against the enlarged circumferential end of the master cylinder piston rod, but will start moving with a delay depending on the cross-section of the throttling connection. Thereby, in an advantageous manner, it is ensured that the positioning piston will abut at the enlarged circumferential end in a relatively soft manner. Thus, a corresponding jerk at the brake pedal will be avoided. This mode of operation helps enhance the operational comfort when operating the brake system. Moreover, it will be impossible in traffic situations which are critical anyway that the driver of the vehicle will additionally be distracted by a jerk at the brake pedal.

It appears that particularly good results will be achieved if the effective annular surfaces of the positioning piston have a surface ratio of 1:2. With such a rating, at the first moment of pressurization of the positioning piston a pressure will result in the annular chamber which is twice as high as the pressure acting on the positioning piston. In order to exclude influencing the throttling cross-section by, for instance, dirt particles, which have entered the hydraulic medium, the throttling connection is provided with a filter element arranged in the annular chamber. Thus, the hydraulic medium will always be filtered in the annular chamber when pressure medium will flow through the throttling connection.

The constructional realization of the throttling connection generally may be achieved in the many different ways. For instance, the throttling connection may be a throttling channel. A simple solution in terms of manufacturing technology will be achieved if in the area of its larger diameter the positioning piston, with the master cylinder piston rod, forms an annular gap, and hence a radial throttling bore leads into the annular chamber. In this case, the internal bore of the positioning piston may simply be expanded in the area of the annular chamber by a lathe operation. The throttling connection may be established by providing radial throttling bores which do not present any special difficulties as far as manufacture is concerned. It is also conceivable to provide the radial throttling bores with a relatively large cross-section and to equip them later on with commercially available throttling baffles. The delay which will become effective at the positioning piston will be enhanced considerably by the fact that several throttling bores, distributed over the circumference, lead into the annular chamber. This advantageous further development will exclude unilateral pressure forces on the positioning piston and, thus, prevent tilting of the positioning piston. The arrangement of several throttling bores will also enhance the operational reliability since the probability of clogging of the throttling bores due to the infiltration of dirt particles is smaller. Such a change of the cross-sections of the throttles by dirt particles which have entered the hydraulic medium may also be avoided by placing an annular filter on the ends of the throttling bores.

An advantageous and simple solution may also be achieved if the check valve has the construction of a gasket. It will further be advantageous if at the surface area of the positioning piston axial passages are provided from the larger front surface to the annular chamber. For proper operation of the positioning piston, it is necessary to guide the larger diameter portion of the positioning piston in a bore of the housing. On the other hand, a sufficient flow cross-section must be kept free between the bore of the housing and the surface area of the positioning piston. In order to ensure the sufficient flow cross-section, the axial passages are provided at the surface area of the positioning piston which rests at the bore of the housing. The diameters of the bore of the housing and of the larger diameter portion of the positioning piston in this case allow close tolerances in coordinating their dimensions. Thus, a very good guidance of the positioning piston is achieved in the bore of the housing. On the other hand, the diameters of the bore of the housing and of the larger diameter portions of the positioning piston also allow a dimensioning in respect of each other so as to always provide a sufficient annular gap between the positioning piston and the bore of the housing.

BRIEF DESCRIPTION OF THE DRAWING

The above-mentioned and other objects and features of the present invention and the manner of obtaining them will become more apparent by reference to the following description taken in conjunction with the drawing, the single Figure of which is a longitudinal cross sectional view of a brake system in accordance with the principles of the present invention.

DESCRIPTION OF THE PREFERRED EMBODIMENT

In the Figure, a housing includes an axial bore 2 of the housing 1. A positioning piston 3 is guided in bore 2. The positioning piston 3 essentially is constructed as a hollow cylinder and accommodates a master cylinder piston rod 5 in its axial internal bore 4. By means of master cylinder piston rod 5 a master cylinder 6 is operable, or rather a wheel brake 8 may be pressurized via a pressure line 7 connected to the master cylinder 6. Referring to the Figure, the right-hand front or end surface of the master cylinder piston 9 may be connected to a pressure source 11 upon corresponding excitation of an electromagnetic valve 10 so that pressure medium may flow from the pressure source 11 into a working chamber 13 via a gasket 12 arranged at the master cylinder piston 9, which gasket acts as check valve and may open towards working chamber 13 of the master cylinder 6. It is possible to arrange a non-represented hydraulic booster between the pressure source 11 and the valve 10. The master cylinder piston rod 5 protrudes to the right out of the axial internal bore 4 of positioning piston 3 and has an expanded collar 14 which may mechanically abut at the adjacent end surface of positioning piston 3 upon sufficient displacement of master cylinder piston rod 5. Master cylinder piston rod 5 is operable by means of a brake pedal 15. It is also possible to arrange a hydraulic brake booster between the brake pedal 15 and the master cylinder piston rod 5.

The positioning piston 3 featuring essentially the construction of a hollow cylinder has a piston step 16 at its left end, as seen in the Figure. The front surface 17 at this end of positioning piston 3 is likewise pressurizable by the pressure of pressure source 11 upon actuation of the electromagnetically operable valve 10.

After the piston step 16, positioning piston 3 is stepped inwards to have a smaller diameter. At this step a gasket 18 is arranged which acts as a check valve and which may open towards an annular chamber 19 situated to the right of step 16 if there is a sufficient pressure difference from the left front surface of positioning piston 3 to the annular chamber 19. The smaller diameter of positioning piston 3 is sealed with respect to housing 1 by means of a gasket 20 which is supported axially immovable in the bore 2 of housing 1.

A radial throttling bore 21 leads from the annular chamber 19 to the inner surface area of positioning piston 3, ending there in an annular gap 22 which is hydraulically communicating with the chamber 23 defined by the front surface 17. The end of the radial throttling bore 21 in the annular chamber 19 is covered by an annular filter 24.

Referring to the Figure, the right-hand end of positioning piston 3 carries a spring plate 25 supporting itself at housing 1 in the illustrated rest position of the brake system. A compression spring 27 is arranged between spring plate 25 and a further step 26 in housing 1. The annular chamber 28 housing the compression spring 27 communicates with an unpressurized return reservoir 29.

The mode of operation of the above-described arrangement will now be described. In the illustrated rest position of the Figure the brake pedal 15 is not applied and the compression spring 27 keeps positioning piston 3 in a right-hand end position. Upon the action of an operating force on the brake pedal 15, master cylinder piston rod 5 will be displaced within positioning piston 3, pressurizing the working chamber 13 of master cylinder 6 as well as wheel brake 8. In doing so, collar 14 and positioning piston 3 will approach each other until finally parts 3 and 14 will abut. Upon a further increase of the operating force positioning piston 3 will be carried along to the left against the force of the compression spring 27 and annular chamber 19 will expand.

If the pressure in wheel brake 8 has increased to the extent that the wheel is running in a critical slip range electromagnetically operable valves 30 will tap pressure medium from the wheel brake. Thus, the braking pressure in the wheel brake will drop. At the same time, non-illustrated slip-monitoring electronics switch the electromagnetically operable valve 10 so as to connect chamber 23 with pressure source 11.

The pressure medium acting on the front surface 17 will propogate into the annular chamber 19 via the gasket 18. Thus, dependent on the selected effective annular surfaces of positioning piston 3 there will be a pressure increase in annular chamber 19 which will lead to a displacement of pressure medium from annular chamber 19 into chamber 23 via radial throttling bore 21. Thereby, the pressure medium volume contained in the annular chamber 19 will be reduced. Thus, positioning piston 3 is moved to the right at a relatively low speed.

If the rotational behaviour of the wheel has recovered, due to suitable pressure reduction in wheel brake 8, the electromagnetically operable valve 10 will be switched back into its initial position, thereby pressure-relieving chamber 23. Now, master cylinder piston rod 5, in its turn, with positioning piston 3, may be displaced in the direction of operation against the force of compression spring 27, hydraulic medium entering annular chamber 19 via the relatively small resistance of the gasket 18.

While we have described above the principles of our invention in connection with specific apparatus, it is to be clearly understood that this description is made only by way of example and not as a limitation to the scope of our invention as set forth in the objects thereof and in the accompanying claims.

We claim:

1. A hydraulic brake system for motor vehicles with slip control comprising:
   a master brake cylinder having at least one master cylinder piston operating a vehicle wheel brake, hydraulic medium removed from said wheel brake during slip control being supplied to said wheel brake from an auxiliary pressure source via a gasket acting as a first check valve disposed on the circumference of said master cylinder piston;
   a hollow positioning piston axially guided in and sealed to an axial bore of a housing, said positioning piston having an end surface thereof pressurized by said auxiliary pressure source during slip control to limit the operating stroke of said master cylinder piston; and
   a master cylinder piston rod axially guided in and sealed to the inner surface of said positioning piston;
   said positioning piston being a stepped piston having a large diameter portion, a smaller diameter portion sealed at a given point with respect to said axial bore and a step between said smaller diameter section and said larger diameter portion, said step and said given point defining an annular chamber having a volume dependent on movement of said master cylinder piston rod, said chamber having a throttling connection to said end surface disposed on the surface of said larger diameter portion remote from said step, said throttling connection having a second check valve therein which opens towards said annular chamber.

2. A brake system according to claim 1, wherein said end surface and surface of said step defining said chamber have a surface ratio of 1:2.

3. A brake system according to claim 1, further including a filter element disposed in said chamber.

4. A brake system according to claim 3, wherein said filter element in an annular filter element.

5. A brake system according to claim 1, wherein said throttling connection includes a throttling channel.

6. A brake system according to claim 5, wherein said throttling connection includes an annular gap between the outer surface of said master cylinder piston rod and the inner surface of said positioning piston in the area of said larger diameter portion and at least one radial throttling bore extending from said chamber to said annular gap.

7. A brake system according to claim 6, further including
   an annular filter element disposed in said chamber covering said throttling bore.

8. A brake system according to claim 6, wherein a plurality of said throttling bores are distributed over the circumference of said positioning piston.

9. A brake system according to claim 8, further including
   an annular filter element disposed in said chamber covering said plurality of said throttling bores.

10. A brake system according to claim 1, wherein said second check valve is a gasket disposed at said step in said chamber.

11. A brake system according to claim 10, wherein axial passages are provided between the outer surface of said larger diameter portion and the inner surface of said axial bore extending from said end surface to said chamber, said gasket covering said axial passages.

12. A brake system according to claim 11, wherein said throttling connection includes an annular gap between the outer surface of said master cylinder piston rod and the inner surface of said positioning piston in the area of said larger diameter portion and at least one radial throttling bore extending from said chamber to said annular gap.

13. A brake system according to claim 12, further including
   an annular filter element disposed in said chamber covering said throttling bore.

14. A brake system according to claim 12, wherein a plurality of said throttling bores are distributed over the circumference of said positioning piston.

15. A brake system according to claim 14, further including
an annular filter element disposed in said chamber covering said plurality of said throttling bores.

16. A brake system according to claim 1, wherein said throttling connection includes an annular gap between the outer surface of said master cylinder piston rod and the inner surface of said positioning piston in the area of said larger diameter portion and at least one radial throttling bore extending from said chamber to said annular gap.

17. A brake system according to claim 16, further including
an annular filter element disposed in said chamber covering said throttling bore.

18. A brake system according to claim 16, wherein a plurality of said throttling bores are distributed over the circumference of said positioning piston.

19. A brake system according to claim 18, further including
an annular filter element disposed in said chamber covering said plurality of said throttling bores.

* * * * *